(12) United States Patent
Zhang

(10) Patent No.: US 12,413,540 B2
(45) Date of Patent: *Sep. 9, 2025

(54) NETWORK CONGESTION NOTIFICATION METHOD, AGENT NODE, AND COMPUTER DEVICE

(71) Applicant: Huawei Technologies Co., Ltd., Shenzhen (CN)

(72) Inventor: Wei Zhang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/734,627

(22) Filed: May 2, 2022

(65) Prior Publication Data

US 2022/0263767 A1 Aug. 18, 2022

Related U.S. Application Data

(63) Continuation of application No. 16/786,461, filed on Feb. 10, 2020, now Pat. No. 11,374,870, which is a (Continued)

(30) Foreign Application Priority Data

Aug. 11, 2017 (CN) .......................... 201710687388.0

(51) Int. Cl.
*H04L 49/356* (2022.01)
*H04L 47/11* (2022.01)
(Continued)

(52) U.S. Cl.
CPC ............ *H04L 49/358* (2013.01); *H04L 47/11* (2013.01); *H04L 47/129* (2022.05);
(Continued)

(58) Field of Classification Search
CPC ....... H04L 47/263; H04L 47/11; H04L 47/12; H04L 47/30; H04L 47/50; H04L 47/803; H04L 69/161
(Continued)

(56) References Cited

U.S. PATENT DOCUMENTS 7,369,498 B1 * 5/2008 Ma ........................ H04L 47/193
370/235
9,270,489 B1 2/2016 Wells et al.
(Continued)

FOREIGN PATENT DOCUMENTS

CN 101166140 A 4/2008
CN 101188611 A 5/2008
(Continued)

OTHER PUBLICATIONS

Darren Harkins "RDMA over Converged Ethernet," May 31, 2017, XP055698288, 24 pages.
(Continued)

*Primary Examiner* — Intekhaab A Siddiquee
(74) *Attorney, Agent, or Firm* — Conley Rose, P.C.

(57) ABSTRACT

A network congestion notification method and network node are provided in a network system. The network node receives a remote direct memory access (RDMA) packet, where the RDMA packet carries a source queue pair number corresponding to a transmit end and a destination queue pair number corresponding to a receive end. The network node generates a congestion notification packet when detecting network congestion, where a destination queue pair number of the congestion notification packet is the source queue pair number. Then the network node sends the congestion notification packet to the transmit end so that the transmit end may decrease a sending rate of a data flow to which the first data packet belongs.

17 Claims, 8 Drawing Sheets

Related U.S. Application Data continuation of application No. PCT/CN2018/095602, filed on Jul. 13, 2018.

(51) Int. Cl.

| | | |
|---|---|---|
| *H04L 47/129* | (2022.01) | |
| *H04L 47/263* | (2022.01) | |
| *H04L 47/30* | (2022.01) | |
| *H04L 47/50* | (2022.01) | |
| *H04L 47/80* | (2022.01) | |
| *H04L 69/16* | (2022.01) | |

(52) U.S. Cl.
CPC ............ *H04L 47/263* (2013.01); *H04L 47/30* (2013.01); *H04L 47/50* (2013.01); *H04L 47/803* (2013.01); *H04L 69/161* (2013.01)

(58) Field of Classification Search
USPC ........................................................ 370/235
See application file for complete search history.

(56) References Cited

U.S. PATENT DOCUMENTS

| | | | |
|---|---|---|---|
| 10,148,581 B2 * | 12/2018 | Shahar | .................. H04L 1/1635 |
| 10,257,273 B2 * | 4/2019 | Govind | ............ G06F 15/17331 |
| 2006/0203730 A1 | 9/2006 | Zur | |
| 2008/0002578 A1 | 1/2008 | Coffman et al. | |
| 2013/0080561 A1 | 3/2013 | Fox et al. | |
| 2013/0080562 A1 | 3/2013 | Fox et al. | |
| 2014/0244965 A1 * | 8/2014 | Manula | ............... G06F 12/1081 |
| | | | 711/206 |
| 2015/0341273 A1 | 11/2015 | Naouri et al. | |
| 2015/0381505 A1 | 12/2015 | Sundararaman et al. | |
| 2016/0380896 A1 | 12/2016 | Caulfield et al. | |
| 2017/0171075 A1 | 6/2017 | Sajeepa et al. | |
| 2018/0198715 A1 * | 7/2018 | Shmilovici | ............. H04L 45/66 |
| 2019/0116126 A1 | 4/2019 | Shen et al. | |
| 2020/0396170 A1 * | 12/2020 | Gafni | .................... H04L 47/263 |

FOREIGN PATENT DOCUMENTS

| | | | | |
|---|---|---|---|---|
| CN | 101227495 | A | 7/2008 | |
| CN | 102594713 | A | 7/2012 | |
| CN | 102868671 | A | 1/2013 | |
| CN | 102891803 | A | 1/2013 | |
| CN | 104394093 | A | 3/2015 | |
| CN | 104753816 | A | 7/2015 | |
| CN | 105897605 | A | 8/2016 | |
| CN | 106027412 | A | 10/2016 | |
| CN | 107493238 | A | 12/2017 | |
| WO | 2008003249 | A1 | 1/2008 | |
| WO | WO-2013132213 | A1 * | 9/2013 | ........... H04L 43/062 |
| WO | 2015078219 | A1 | 6/2015 | |
| WO | 2016041580 | A1 | 3/2016 | |
| WO | WO-2017215392 | A1 * | 12/2017 | ............. H04L 45/72 |

OTHER PUBLICATIONS

Infiniband Trade Association 1 2, "Supplement to InfiniBand TM Architecture Specification vol. 1 Release 1.2.1," Infiniband Trade Association, Sep. 2, 2014, 23 pages.

Zhu, Y., et al., "Congestion Control for Large-Scale RDMA Deployments," XP058071188, Aug. 17-21, 2015, 14 pages.

Yan Zhang et al., "On Mitigating TCP Incast in Data Center Networks," This paper was presented as part of the Mini-Conference at IEEE Infocom, 2011, 5 pages.

* cited by examiner

NETWORK CONGESTION NOTIFICATION METHOD, AGENT NODE, AND COMPUTER DEVICE

CROSS-REFERENCE TO RELATED APPLICATIONS

This is a continuation of U.S. patent application Ser. No. 16/786,461, filed on Feb. 10, 2020, which is a continuation of International Application No. PCT/CN2018/095602, filed on Jul. 13, 2018, which claims priority to Chinese Patent Application No. 201710687388.0, filed on Aug. 11, 2017. All of the aforementioned patent applications are hereby incorporated by reference in their entireties.

TECHNICAL FIELD

This disclosure relates to the field of data communication technologies, and in particular, to a network congestion notification method, an agent node, and a computer device.

BACKGROUND

Remote direct memory access (RDMA) is a data transmission technology. Data can be directly read from a memory of another computer through a network without using a processor, a cache, an operating system, or the like of a computer. Therefore, a data processing delay is reduced in network transmission. However, a Clos manner is usually used to perform networking in an RDMA data center. An uplink interface bandwidth and a downlink interface bandwidth of a switch are asymmetrical in a network. When data is transmitted in the network, network congestion usually occurs, and RDMA communication performance is further affected. To avoid network congestion and improve RDMA communication performance, network congestion needs to be notified in time.

Currently, when network congestion is notified, the following method is mainly used: In a connection management (CM) process, a transmit end and a receive end each obtain a queue pair number of the peer end. When the transmit end needs to send data to the receive end, the transmit end generates a first data packet based on a link layer transport protocol. A destination queue pair number of the first data packet is the queue pair number of the receive end, an explicit congestion notification (ECN) bit is set in an Internet Protocol (IP) header of the first data packet, the ECN bit is used to identify that the first data packet has an ECN capability, and different values of the ECN bit indicate different states of a network. The transmit end sends the first data packet to a network node. When receiving the first data packet and detecting network congestion, the network node changes a value of the ECN bit in the IP header of the first data packet to a value corresponding to a congestion state, to obtain a processed first data packet, and sends the processed first data packet to the receive end. When receiving the processed first data packet and learning through reading that the value of the ECN bit is the value corresponding to the congestion state, the receive end obtains a source queue pair number (the queue pair number of the transmit end), and generates a first congestion notification packet. A destination queue pair number of the first congestion notification packet is the source queue pair number (the queue pair number of the transmit end). The receive end sends the first congestion notification packet to the transmit end through a network. The first congestion notification packet is used to instruct the transmit end to obtain the destination queue pair number of the first congestion notification packet; and instruct the transmit end to decrease, when the destination queue pair number of the first congestion notification packet is the same as the queue pair number of the transmit end, a sending rate of a data flow to which the first data packet belongs.

In the foregoing solution, when network congestion is detected, each network node on a transmission link between the transmit end and the receive end cannot send the first congestion notification packet to the transmit end, and only the receive end can send the first congestion notification packet. As a result, the transmit end cannot decrease, in time, the sending rate of the data flow to which the first data packet belongs. Consequently, a subsequent packet of the data flow to which the first data packet belongs is lost in a transmission process.

SUMMARY

To resolve a prior-art problem, embodiments of this disclosure provide a network congestion notification method, an agent node, and a computer device. The technical solutions are as follows:

According to a first aspect, a network congestion notification method is provided, and the method includes the following content:

In a data transmission process, an agent node receives a first data packet of a transmit end, where the first data packet carries a destination queue pair number. The agent node obtains a source queue pair number of the first data packet based on the destination queue pair number of the first data packet, adds the source queue pair number to the first data packet to obtain a second data packet, and further sends the first data packet to a receive end by using a network node. In a process of forwarding the second data packet, when detecting network congestion, the network node generates a first congestion notification packet based on the second data packet, and further sends the first congestion notification packet to the agent node. A destination queue pair number of the first congestion notification packet is actually a source queue pair number of the second data packet. When receiving the first congestion notification packet, the agent node sends the first congestion notification packet to the transmit end, so that when the destination queue pair number of the first congestion notification packet is the same as a queue pair number of the transmit end, the transmit end decreases a sending rate of a data flow to which the first data packet belongs.

In the solution described in this embodiment of this disclosure, in a transmission process of the first data packet, the agent node adds the source queue pair number to the first data packet. When detecting network congestion, the network node generates the first congestion notification packet based on the first data packet, and further sends the first congestion notification packet to the transmit end through forwarding of the agent node, so that the transmit end can decrease, in time, the sending rate of the data flow to which the first data packet belongs, to avoid losing a subsequent packet of the data flow.

In a first possible implementation of this disclosure, the agent node maintains a queue pair tracking table, and each entry of the queue pair tracking table stores a correspondence between a destination queue pair number and a source queue pair number. Therefore, when receiving the first data packet, the agent node may find, from the queue pair tracking table based on the destination queue pair number, a source queue pair number corresponding to the destination queue pair number. The found source queue pair number is the source queue pair number of the first data packet.

The solution described in this embodiment of this disclosure provides a manner of obtaining a source queue pair number.

In a second possible implementation of this disclosure, to implement data transmission between the receive end and the transmit end, the transmit end and the receive end need to pre-establish a connection to each other. In a connection establishment process, the agent node may track a connection request packet sent by the transmit end, and use, as a destination queue pair number, a destination queue pair number extracted from a base transport header (BTH) of the connection request packet. In addition, the agent node may track a connection response packet sent by the receive end, use, as a source queue pair number, a destination queue pair number extracted from a BTH of the connection response packet, and further record a correspondence between the source queue pair number and the destination queue pair number in the queue pair tracking table.

In the solution described in this embodiment of this disclosure, the agent node establishes the queue pair tracking table by tracking packets sent by the transmit end and the receive end in the connection establishment process, so that when receiving the first data packet, the agent node can find the corresponding source queue pair number based on the destination queue pair number of the first data packet.

In a third possible implementation of this disclosure, after receiving the source queue pair number, the agent node may divide the source queue pair number into a first part and a second part, add the first part of the source queue pair number to a checksum field in a User Datagram Protocol (UDP) header of the first data packet, and add the second part of the source queue pair number to a reserved field in a base transport header BTH of the first data packet, to obtain the second data packet.

In the solution described in this embodiment of this disclosure, the agent node adds the source queue pair number to the first data packet, so that the first data packet carries the source queue pair number. Therefore, during network congestion, the agent node can quickly send the first congestion notification packet to the transmit end based on the source queue pair number. This increases a transmission rate of the first congestion notification packet.

In a fourth possible implementation of this disclosure, when receiving the second data packet and detecting network congestion, the network node parses the second data packet to obtain a source media access control (MAC) address of the second data packet, a destination MAC address of the second data packet, a source Internet Protocol (IP) address of the second data packet, a destination IP address of the second data packet, and a source queue pair number of the second data packet. Based on a parsing result, the network node obtains the first congestion notification packet by using the source MAC address of the second data packet as a destination MAC address of the first congestion notification packet, using the destination MAC address of the second data packet as a source MAC address of the first congestion notification packet, using the source IP address of the second data packet as a destination IP address of the first congestion notification packet, using the destination IP address of the second data packet as a source IP address of the first congestion notification packet, and using the source queue pair number of the second data packet as the destination queue pair number of the first congestion notification packet.

In a fifth possible implementation of this disclosure, the first congestion notification packet includes a queue depth, at a congestion moment, of a queue to which the data flow belongs on the network node. The agent node can determine a sending period of the first congestion notification packet based on the queue depth, and may subsequently send the first congestion notification packet based on the determined sending period.

In the solution described in this embodiment of this disclosure, the agent node can learn of a congestion degree of a current network based on the queue depth, at the congestion moment, of the queue to which the data flow belongs on the network node, and further send the first congestion notification packet to the transmit end based on the sending period determined based on the congestion degree of the network, so that the transmit end can determine, based on the congestion degree of the network, the sending rate of the data flow to which the first data packet belongs. Therefore, the transmit end sends the first data packet at a maximum sending rate while avoiding network congestion, to reduce a delay in the data transmission process.

According to a second aspect, a network congestion notification method is provided, and the method includes the following content:

In a data transmission process, an agent node receives a first data packet that carries a destination queue pair number and that is sent by a transmit end, and sends the first data packet to a receive end by using a network node. In a process of forwarding the first data packet, when detecting network congestion, the network node generates a second congestion notification packet based on the first data packet, and sends the second congestion notification packet to the agent node. A destination queue pair number of the second congestion notification packet is actually the destination queue pair number of the first data packet. When receiving the second congestion notification packet, the agent node obtains, based on the destination queue pair number of the second congestion notification packet, a source queue pair number corresponding to the destination queue pair number, replaces the destination queue pair number of the second congestion notification packet with the source queue pair number to obtain a first congestion notification packet, and further sends the first congestion notification packet to the transmit end, so that when a destination queue pair number of the first congestion notification packet is the same as a queue pair number of the transmit end, the transmit end decreases a sending rate of a data flow to which the first data packet belongs.

In the solution described in this embodiment of this disclosure, in a transmission process of the first data packet, when detecting network congestion, the network node generates the second congestion notification packet, and sends the second congestion notification packet to the agent node. The agent node obtains the first congestion notification packet after replacing the destination queue pair number of the second congestion notification packet with the source queue pair number of the first data packet, and further sends the first congestion notification packet to the transmit end, so that the transmit end can decrease, in time, the sending rate of the data flow to which the first data packet belongs, to avoid losing a subsequent packet of the data flow.

In a first possible implementation of this disclosure, when receiving the first data packet and detecting network congestion, the network node parses the first data packet to obtain a source media access control MAC address of the first data packet, a destination MAC address of the first data packet, a source Internet Protocol IP address of the first data packet, a destination IP address of the first data packet, and the destination queue pair number of the first data packet. Based on a parsing result, the network node may obtain the second congestion notification packet by using the source MAC address of the first data packet as a destination MAC address of the second congestion notification packet, using the destination MAC address of the first data packet as a source MAC address of the second congestion notification packet, using the source IP address of the first data packet as a destination IP address of the second congestion notification packet, using the destination IP address of the first data packet as a source IP address of the second congestion notification packet, and using the destination queue pair number of the first data packet as the destination queue pair number of the second congestion notification packet.

In a second possible implementation of this disclosure, the agent node maintains a queue pair tracking table, and each entry of the queue pair tracking table stores a correspondence between a destination queue pair number and a source queue pair number. Therefore, when receiving the first data packet, the agent node may find, from the queue pair tracking table based on the destination queue pair number, a source queue pair number corresponding to the destination queue pair number. The found source queue pair number is the source queue pair number of the first data packet.

The solution described in this embodiment of this disclosure provides a manner of obtaining a source queue pair number.

In a third possible implementation of this disclosure, to implement data transmission between the receive end and the transmit end, the transmit end and the receive end need to pre-establish a connection to each other. In a connection establishment process, the agent node may track a connection request packet sent by the transmit end, and use, as a destination queue pair number, a destination queue pair number extracted from a base transport header of the connection request packet. In addition, the agent node may track a connection response packet sent by the receive end, use, as a source queue pair number, a destination queue pair number extracted from a BTH of the connection response packet, and further establish a correspondence between the source queue pair number and the destination queue pair number in the queue pair tracking table.

In the solution described in this embodiment of this disclosure, the agent node establishes the queue pair tracking table by tracking packets sent by the transmit end and the receive end in the connection establishment process, so that when receiving the first data packet, the agent node can find the corresponding source queue pair number based on the destination queue pair number of the first data packet.

In a fourth possible implementation of this disclosure, the first congestion notification packet includes a queue depth, at a congestion moment, of a queue to which the data flow belongs on the network node. The agent node can determine a sending period of the first congestion notification packet based on the queue depth, and may subsequently send the first congestion notification packet based on the determined sending period.

In the solution described in this embodiment of this disclosure, the agent node can learn of a congestion degree of a current network based on the queue depth, at the congestion moment, of the queue to which the data flow belongs on the network node, and further send the first congestion notification packet to the transmit end based on the sending period determined based on the congestion degree of the network, so that the transmit end can determine, based on the congestion degree of the network, the sending rate of the data flow to which the first data packet belongs. Therefore, the transmit end sends the first data packet at a maximum sending rate while avoiding network congestion, to reduce a delay in the data transmission process.

According to a third aspect, an agent node for network congestion notification is provided. The agent node includes units for implementing the network congestion notification method in the first aspect, for example, a packet receiving unit, a number obtaining unit, a number adding unit, and a packet sending unit.

According to a fourth aspect, an agent node for network congestion notification is provided. The agent node includes units for implementing the network congestion notification method in the second aspect, for example, a packet receiving unit, a packet sending unit, a number obtaining unit, and a number replacement unit.

According to a fifth aspect, a computer device is provided, including a memory, a processor, a communications interface, and a bus.

The memory, the processor, and the communications interface are connected to each other by using the bus. The memory is configured to store a computer instruction, and the processor is configured to execute the computer instruction stored in the memory. When the computer device runs, the processor runs the computer instruction, so that the computer device performs the network congestion notification method in the first aspect.

According to a sixth aspect, a computer device is provided, including a memory, a processor, a communications interface, and a bus.

The memory, the processor, and the communications interface are connected to each other by using the bus. The memory is configured to store a computer instruction, and the processor is configured to execute the computer instruction stored in the memory. When the computer device runs, the processor runs the computer instruction, so that the computer device performs the network congestion notification method in the second aspect.

According to a seventh aspect, a storage medium is provided. The storage medium stores at least one instruction, and the at least one instruction is loaded and executed by a processor to implement the network congestion notification method in the first aspect.

According to an eighth aspect, a storage medium is provided. The storage medium stores at least one instruction, and the at least one instruction is loaded and executed by a processor to implement the network congestion notification method in the second aspect.

DESCRIPTION OF EMBODIMENTS

To make the objectives, technical solutions, and advantages of this disclosure clearer, the following further describes the implementations of this disclosure in detail with reference to the accompanying drawings.

To resolve a delay of data processing at a server end in a network transmission process, an RDMA technology is used for data transmission in the embodiments of this disclosure. In the RDMA technology, data can be directly transmitted to a storage area of a computer through a network without using a processor of the computer, and therefore system performance is improved.

Figure 1:
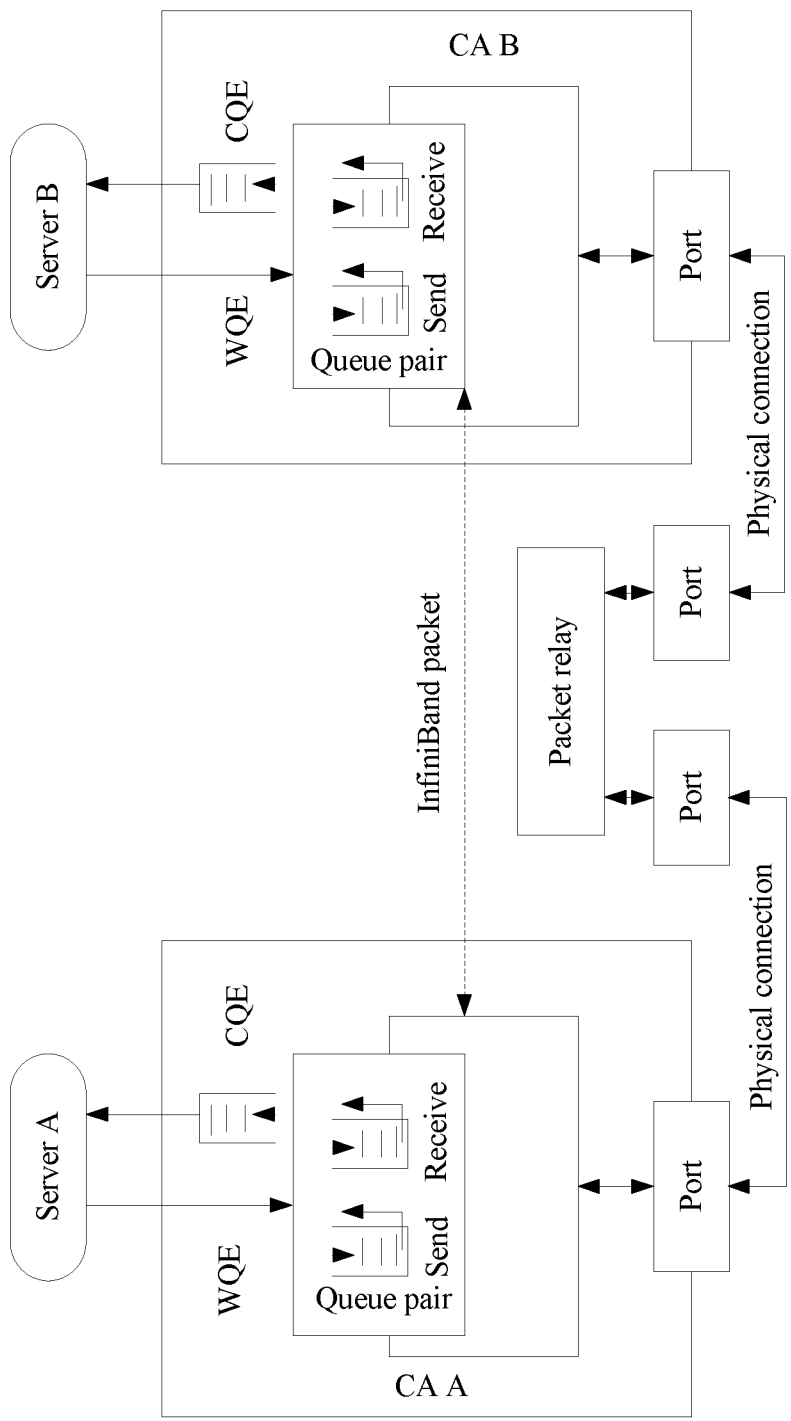
FIG. 1 is a schematic diagram of an RDMA communication procedure according to an embodiment of this disclosure.

FIG. 1 is a schematic diagram of an RDMA communication procedure. Referring to FIG. 1, two computer systems are used in RDMA communication. One computer system includes a server A and a channel adapter (CA) A, and the other computer system includes a server B and a channel adapter B. Each channel adapter is divided into a transport layer, a network layer, a link layer, a physical layer, and the like.

Inside each computer system, a central processing unit (CPU) of the server communicates with the channel adapter by using a queue pair (QP). The queue pair includes a send queue and a receive queue. The send queue is used by the CPU to send a command to the channel adapter, and the command is referred to as a work queue element (WQE). The receive queue is used by the CPU to receive a command from the channel adapter, and the command is referred to as a complete queue element (CQE). When completing execution of the WQE sent by the CPU, the channel adapter sends the CQE to the CPU to feed back a complete status.

In the two computer systems, the server A establishes a physical connection to a port of a network node through a port, and communicates with the network node based on the established connection; and the server B establishes a physical connection to a port of a network node through a port, and communicates with the network node based on the established connection. Nodes in a network each may establish a connection to each other through a port, and forward a packet based on the established connection. Based on network connections between the server A and the network node, between network nodes, and between the network node and the server B, the channel adapter A communicates and the channel adapter B communicate with each other by sending, to each other, an InfiniB and (IB) packet carrying a destination queue pair number.

Figure 2:
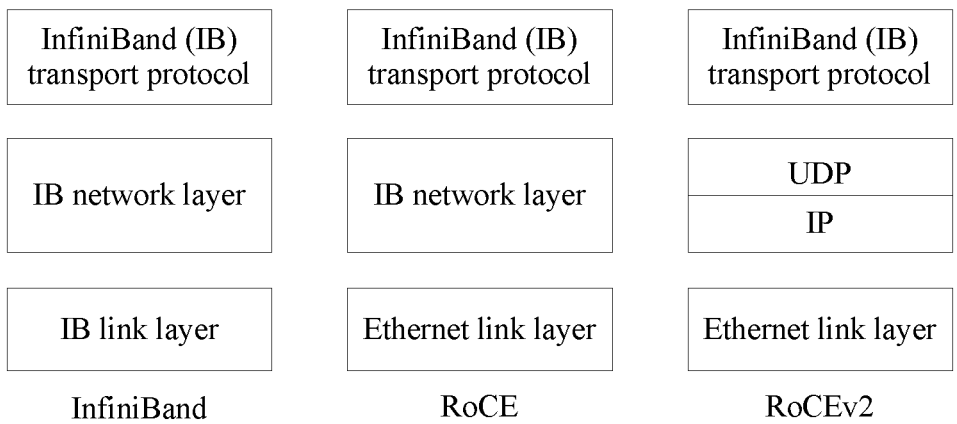
FIG. 2 is a schematic diagram of an RDMA protocol stack according to an embodiment of this disclosure.

FIG. 2 is a schematic diagram of an RDMA protocol stack. It can be learned from FIG. 2 that an application layer protocol is used for RDMA. A transport layer protocol may be the InfiniBand transport layer protocol and the like; a network layer protocol may be the InfiniBand network layer protocol and the UDP/IP protocol; and a bottom link layer protocol may be the InfiniB and link layer protocol, the RoCE protocol based on Ethernet, the RoCEv2 protocol based on Ethernet, and the like.

The InfiniB and protocol is a layered protocol (similar to the TCP/IP protocol). Each layer is responsible for a different function, a lower layer serves an upper layer, and different layers are independent of each other. RDMA protocol packets of the InfiniB and protocol, the RoCE protocol based on Ethernet, the RoCEv2 protocol based on Ethernet each include a base transport header (base transport header, BTH) and an IB payload.

The BTH has a length of 12 bits, and mainly includes a packet sequence number (packet sequence number, PSN), a destination queue pair (destination QP), and a packet OP code (packet OPcode). The destination queue pair is used to indicate a QP number of a receive end.

Figure 3:
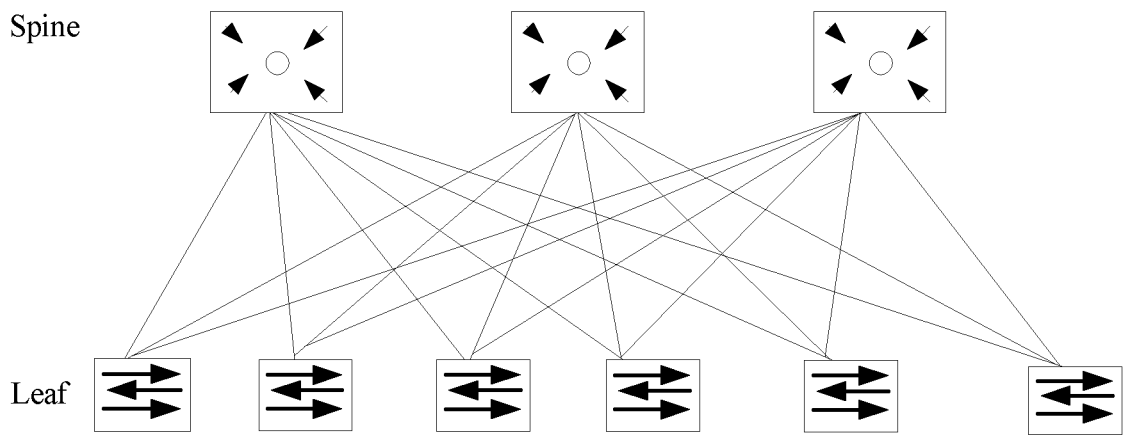
FIG. 3 is a schematic diagram of a Clos networking structure according to an embodiment of this disclosure.
Figure 4A:
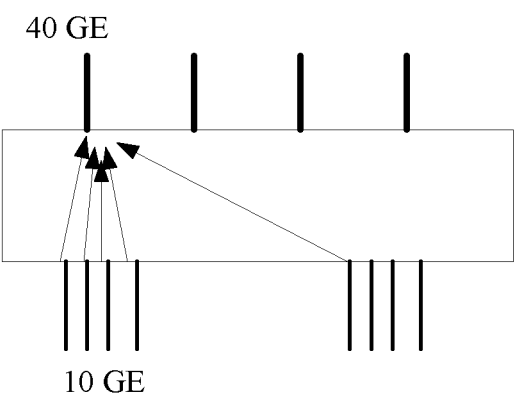
FIG. 4A and FIG. 4B are a schematic diagram of an RDMA congestion scenario according to an embodiment of this disclosure.
Figure 4B:
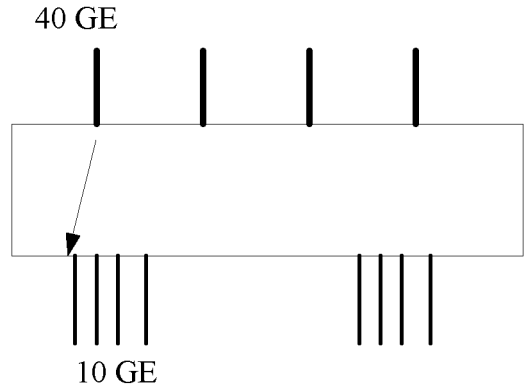

Currently, a Clos architecture is used for networking in RDMA. For example, FIG. 3 shows a data center network of a Clos architecture constructed in a spine-leaf manner. When the Clos architecture is used for networking, an uplink interface bandwidth and a downlink interface bandwidth of a switch are asymmetrical, and a quantity of uplink interfaces (an interface configured to connect to a router or an upper-level switch in the switch) is less than a quantity of downlink interfaces (an interface configured to connect to a host in the host). As a result, network congestion may exist in a data transmission process. FIG. 4A and FIG. 4B are diagrams of RDMA network congestion scenarios. In the figure, each uplink interface of the switch has a bandwidth of 40 GE, and each downlink interface has a bandwidth of 10 GE. Referring to FIG. 4A, in a scenario in which a receive end sends data to a transmit end, when data received from five downlink interfaces is sent to one uplink interface, network congestion occurs. Referring to FIG. 4B, in a scenario in which the transmit end sends data to the receive end, when data is sent to one downlink interface through one uplink interface, network congestion also occurs. When network congestion occurs, RDMA communication performance degrades sharply. Therefore, to improve RDMA communication performance, network congestion needs to be notified when an RDMA technology is used for data transmission. In an existing network congestion notification method, when network congestion is detected, a data packet is sent to a receive end. The receive end generates a congestion notification packet, and further sends the generated congestion notification packet to a transmit end. When network congestion is detected, the transmit end fails to decrease a sending rate of a data packet in time. Consequently, buffer overflow occurs in a network device, and data is further lost in a transmission process.

To notify a transmit end of a network status in time, the embodiments of this disclosure provide a network congestion notification method. In the method, when receiving a data packet and detecting network congestion, a network node sends a congestion notification packet to the transmit end by using an agent node, to notify the transmit end of a current network status, so that the transmit end decreases a sending rate of a data packet, to alleviate a network congestion, thereby avoiding a data loss.

Figure 5:
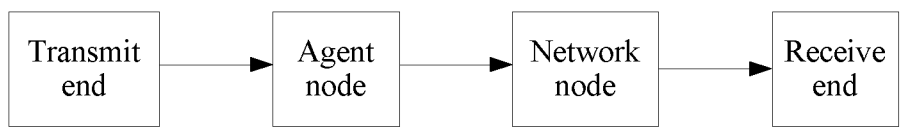
FIG. 5 shows an implementation environment used in a network congestion notification method according to an embodiment of this disclosure.

FIG. 5 shows a system used in a network congestion notification method according to an embodiment of this disclosure. Referring to FIG. 5, the system includes a transmit end, an agent node, a network node, and a receive end.

The transmit end and the receive end may be computers in a network. Roles of the transmit end and the receive end are not fixed. The transmit end may be a receive end in a next data transmission process, and the receive end may be a transmit end in the next data transmission process.

The network node may be a switch, a router, or the like in the network. A type of the network node is not limited in this embodiment of this disclosure.

Figure 6:
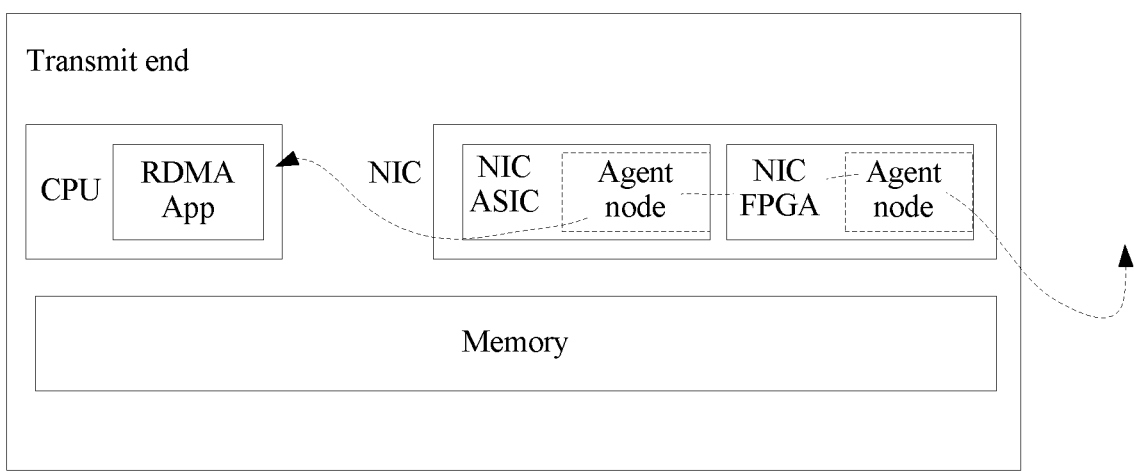
FIG. 6 is a schematic diagram of a location of an agent node in a system according to an embodiment of this disclosure.
Figure 7:
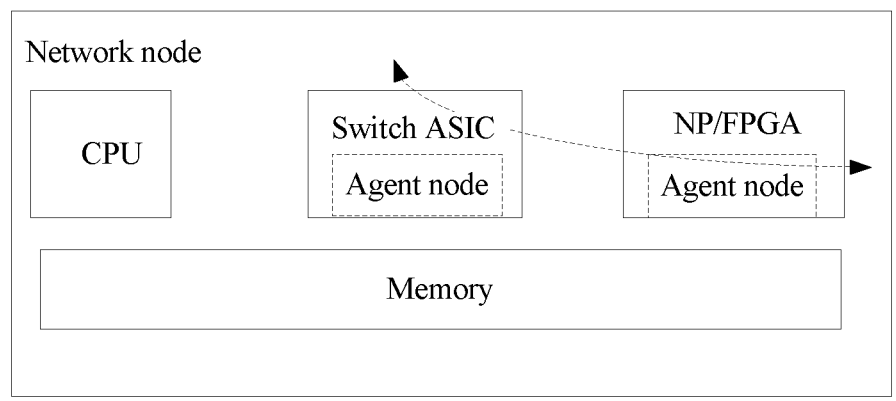
FIG. 7 is a schematic diagram of a location of an agent node in a system according to an embodiment of this disclosure.

The agent node is a hardware unit in the network, and may be located inside the transmit end or inside the network node. Referring to FIG. 6, when the agent node is located inside the transmit end, the agent node may be deployed in a form of hardware logic in a network interface card (MC), an application-specific integrated circuit (ASIC), a microcode on a NIC, or logic code on a MC field-programmable gate array (FPGA) chip. A dashed line in FIG. 6 shows a working process of the agent node. To be specific, after obtaining, inside the transmit end, a data packet of the receive end, the agent node sends the data packet of the receive end to an RDMA application (APP) of the transmit end; and after obtaining, inside the transmit end, a data packet of the transmit end, the agent node sends the data packet to the receive end through a network. Referring to FIG. 7, when the agent node is located inside the network node, the agent node may be deployed in a form of hardware logic in a switch ASIC, a microcode at a notification point (notification point, NP) externally mounted on a switch chip, or logic code of an FPGA chip externally mounted on a switch chip. A dashed line in FIG. 7 shows a working process of the agent node. To be specific, after obtaining a data packet of the receive end, the agent node sends the data packet of the receive end to the transmit end through a network; and after obtaining a data packet of the transmit end, the agent node sends the data packet of the transmit end to the receive end through the network.

Figure 8:
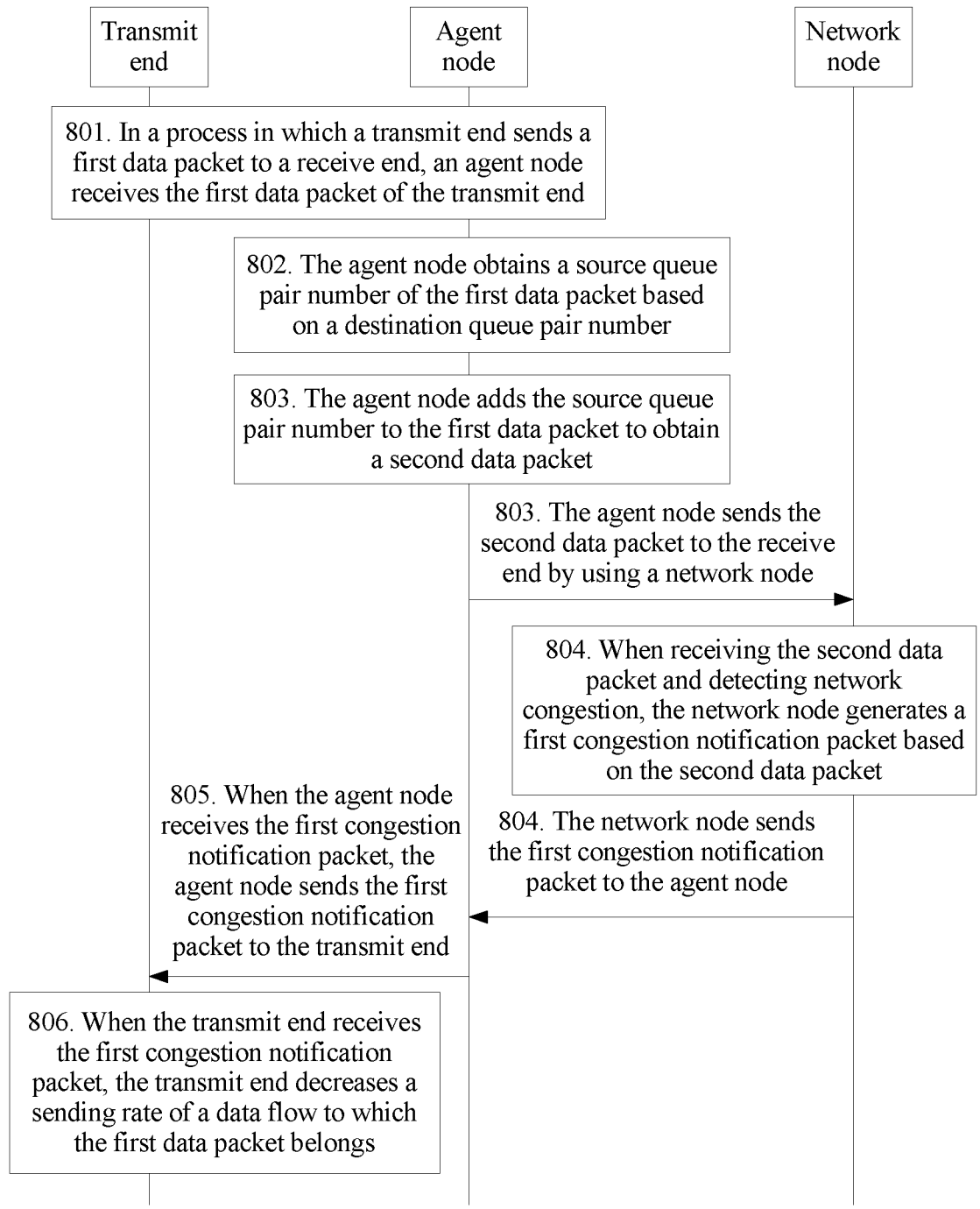
FIG. 8 is a flowchart of a network congestion notification method according to an embodiment of this disclosure.

Based on the system shown in FIG. 5, an embodiment of this disclosure provides a network congestion notification method. Referring to FIG. 8, a method procedure provided in this embodiment of this disclosure includes the following steps.

801. In a process in which the transmit end sends a first data packet to the receive end, the agent node receives the first data packet of the transmit end.

When the transmit end needs to send data to the receive end, the transmit end obtains a MAC address of the transmit end, an IP address of the transmit end, a MAC address of the receive end, an IP address of the receive end, and a destination queue pair number of the receive end, and generates a standard RDMA data packet based on an RDMA packet format. To facilitate viewing of a current network status, the transmit end further sets an ECN bit in an IP header of the RDMA data packet. The ECN bit is used to identify that the RDMA transmit end has an ECN capability, and different values of the ECN bit indicate different states of a network. For example, a value 10 may be used to indicate that the network is in a normal state, a value 11 may be used to indicate that the network is in a congestion state, and so on. At an initial moment, the network is in the normal state by default. In other words, a value of the ECN bit is 10. Table 1 shows a packet format of the generated standard RDMA data packet:

TABLE 1

| MAC header | IP header ECN = 10 | IP checksum | IB transport header | Data | iCRC | Eth FCS |
|---|---|---|---|---|---|---|

The MAC header is a MAC header field; the IP header is an IP header field, and a value of an ECN bit of the IP header is 10; the IB transport header is an IB transport header field; the data is to-be-sent data; the iCRC is a data transmission error check field; and the Eth frame check sequence (FCS) is a check field, and is used to store an iCRC check value.

It should be noted that a plurality of RDMA data packets are used in this disclosure. To distinguish between different RDMA data packets, an RDMA data packet generated by the transmit end may be referred to as a first data packet, and a new data packet obtained by the agent node based on the first data packet is referred to as a second data packet. The first data packet carries a source MAC address (the MAC address of the transmit end), a source IP address (the IP address of the transmit end), a destination MAC address (the MAC address of the receive end), a destination IP address (the IP address of the receive end), a destination queue pair number, and the like.

In a process in which the transmit end sends the first data packet to the receive end through a network, the first data packet passes through the transmit end and all network nodes in the network. Because the agent node is located inside the transmit end or inside the network node, the agent node can receive the first data packet, and further process the received first data packet.

802. The agent node obtains a source queue pair number of the first data packet based on a destination queue pair number.

When receiving the first data packet, the agent node may obtain the destination queue pair number of the first data packet by parsing the first data packet, and further obtain the source queue pair number of the first data packet based on the destination queue pair number. The agent node may obtain the source queue pair number of the first data packet based on the destination queue pair number in a manner including but not limited to the following manner: The agent node searches, based on the destination queue pair number, a pre-established queue pair tracking table for the source queue pair number corresponding to the destination queue pair number. Each entry of the queue pair tracking table stores a correspondence between a destination queue pair number and a source queue pair number.

The queue pair tracking table is a key to obtaining the source queue pair number of the first data packet by the agent node. Therefore, before obtaining the source queue pair number of the first data packet, the agent node needs to establish the queue pair tracking table. The queue pair tracking table is established in the following process.

Step 1: The agent node tracks a connection request packet and a connection response packet that are respectively sent by each pair of a transmit end and a receive end in a connection establishment process.

In the field of Internet technologies, before sending a to-be-sent data packet to the receive end, the transmit end first needs to establish a connection, and obtains related information of the peer end in the connection establishment process. The transmit end sends the connection request packet to the receive end. The connection request packet carries a MAC address of the transmit end, an IP address of the transmit end, a queue pair number of the transmit end, and the like. When receiving the connection request packet, the receive end may parse the connection request packet to obtain the MAC address of the transmit end, the IP address of the transmit end, the queue pair number of the transmit end, and the like. In addition, the receive end also sends the connection response packet to the transmit end. The connection response packet carries a MAC address of the receive end, an IP address of the receive end, a queue pair number of the receive end, and the like. When receiving the connection response packet, the transmit end may parse the connection response packet to obtain the MAC address of the receive end, the IP address of the receive end, the queue pair number of the receive end, and the like.

In a process of establishing a connection between the transmit end and the receive end, the connection request packet and the connection response packet passes through the transmit end, all the network nodes in the network, and the receive end. Because the agent node is located inside the transmit end or inside the network node, the agent node can track the connection request packet and the connection response packet that are respectively sent by the transmit end and the receive end in a process of probing into each other, and further establish the queue pair tracking table.

Step 2: The agent node extracts a destination queue pair number from a BTH of the connection request packet, and extracts a destination queue pair number from a BTH of the connection response packet.

In this embodiment of this disclosure, the connection request packet and the connection response packet each have a base transport header BTH, and the BTH carries a destination queue pair number. Therefore, the agent node may obtain the destination queue pair number of the connection request packet by parsing the BTH of the connection request packet, and may obtain the destination queue pair number of the connection response packet by parsing the BTH of the connection response packet.

Step 3: The agent node uses the destination queue pair number extracted from the connection request packet as a destination queue pair number, uses the destination queue pair number extracted from the connection response packet as a source queue pair number, and records a correspondence between the source queue pair number and the destination queue pair number to obtain the queue pair tracking table.

For example, in a process of establishing a connection between a transmit end 1 and a receive end 1, if a destination queue pair number extracted by the agent node from a BTH of a connection request packet of the transmit end 1 is 0X1010A1, and a destination queue pair number extracted by the agent node from a BTH of a connection response packet of the receive end 1 is 0X1010F1, the agent node may use 0X1010A1 as a destination queue pair number, use 0X1010F1 as a source queue pair number, and record a correspondence between the extracted source queue pair number 0X1010F1 and the extracted destination queue pair number 0X1010A1. In a process of establishing a connection between a transmit end 2 and a receive end 2, if a destination queue pair number extracted by the agent node from a BTH of a connection request packet of the transmit end 2 is 0X1010A2, and a destination queue pair number extracted by the agent node from a BTH of a connection response packet of the receive end 2 is 0X1010F2, the agent node may use 0X1010A2 as a destination queue pair number, use 0X1010F2 as a source queue pair number, and record a correspondence between the extracted source queue pair number 0X1010F2 and the extracted destination queue pair number 0X1010A2. By tracking processes of establishing connections between different transmit ends and different receive ends, the queue pair tracking table shown in Table 2 can be established.

TABLE 2

| Source queue pair number (24 bits) | Destination queue pair number (24 bits) |
|---|---|
| 0X1010F1 | 0X1010A1 |
| 0X1010F2 | 0X1010A2 |

In another embodiment of this disclosure, to obtain the source queue pair number of the first data packet more accurately, when establishing the queue pair tracking table, the agent node may further obtain a MAC address of the transmit end, a MAC address of the receive end, an IP address of the transmit end, an IP address of the receive end, a transport layer protocol between the transmit end and the receive end, and the like, and further establishes the queue pair tracking table based on a queue pair number of the transmit end, a queue pair number of the receive end, the MAC address of the transmit end, the MAC address of the receive end, the IP address of the transmit end, the IP address of the receive end, and the transport layer protocol. When receiving the first data packet, the agent node may obtain, by parsing the first data packet, the destination queue pair number of the first data packet, the source MAC address, the destination MAC address, the source IP address, the destination IP address, the transport layer protocol, and the like, further search the queue pair tracking table for a source queue pair number that is corresponding to the destination queue pair number, the source MAC address, the destination MAC address, the source IP address, the destination IP address, and the transport layer protocol, and use the found source queue pair number as the source queue pair number of the first data packet. In such a processing manner, a corresponding source queue pair number can be accurately found in scenarios in which there is one transmit end and one receive end, there is one transmit end and at least two receive ends, and there is two transmit ends and one receive end.

803. The agent node adds the source queue pair number to the first data packet to obtain a second data packet, and sends the second data packet to the receive end by using the network node.

After obtaining the source queue pair number, the agent node may obtain the second data packet by adding the source queue pair number to the first data packet. In such a processing manner, the second data packet also carries the source queue pair number, so that in a transmission process of the second data packet, when detecting network congestion, the network node can quickly determine the transmit end based on the source queue pair number carried in the second data packet.

The agent node may perform the following steps to obtain the second data packet by adding the source queue pair number to the first data packet.

Step 1: The agent node divides the source queue pair number into a first part and a second part.

A length of the first part and a length of the second part may be the same or may be different, provided that a sum of the length of the first part and the length of the second part is equal to a length of the source queue pair number.

Step 2: The agent node adds the first part to a checksum field of a UDP header of the first data packet, and adds the second part to a reserved field in a base transport header BTH of the first data packet, to obtain the second data packet.

For example, the length of the source queue pair number is 16 bits. The agent node divides the source queue pair number into an 8-bit first part and an 8-bit second part, adds the 8-bit first part to the checksum field in the UDP header (UDP Checksum) of the first data packet, and adds the 8-bit second part to the reserved field in the BTH of the first data packet, to obtain the second data packet.

804. When receiving the second data packet and detecting network congestion, the network node generates a first congestion notification packet based on the second data packet, and sends the first congestion notification packet to the agent node.

When the second data packet is transmitted to a network node in a network, the network node detects network congestion. The network node generates the first congestion notification packet based on the second data packet, and a value of an ECN bit of the first congestion notification packet is a value corresponding to a congestion state. The network node further sends the first congestion notification packet to the agent node. The agent node sends the first congestion notification packet to the transmit end, to notify the transmit end of a current network status, so that the transmit end decreases a sending rate of a data flow to which the first data packet belongs. In addition, to ensure normal transmission of a data packet, the network node further continues to forward the second data packet to the receive end.

The network node may generate the first congestion notification packet based on the second data packet by performing the following steps.

Step 1: The network node parses the second data packet to obtain a source MAC address of the second data packet, a destination MAC address of the second data packet, a source IP address of the second data packet, a destination IP address of the second data packet, and a source queue pair number of the second data packet.

The second data packet carries the source MAC address of the second data packet, the destination MAC address of the second data packet, the source IP address of the second data packet, the destination IP address of the second data packet, and the source queue pair number of the second data packet. Therefore, the network node may parse the second data packet to obtain the source MAC address of the second data packet, the destination MAC address of the second data packet, the source IP address of the second data packet, the destination IP address of the second data packet, and the source queue pair number of the second data packet.

Step 2: The network node obtains the first congestion notification packet by using the source MAC address of the second data packet as a destination MAC address of the first congestion notification packet, using the destination MAC address of the second data packet as a source MAC address of the first congestion notification packet, using the source IP address of the second data packet as a destination IP address of the first congestion notification packet, using the destination IP address of the second data packet as a source IP address of the first congestion notification packet, and using the source queue pair number of the second data packet as a destination queue pair number of the first congestion notification packet.

Based on the RDMA packet format, the network node may obtain the first congestion notification packet by using the source MAC address of the second data packet as the destination MAC address of the first congestion notification packet, using the destination MAC address of the second data packet as the source MAC address of the first congestion notification packet, using the source IP address of the second data packet as the destination IP address of the first congestion notification packet, using the destination IP address of the second data packet as the source IP address of the first congestion notification packet, and using the source queue pair number of the second data packet as the destination queue pair number of the first congestion notification packet. A reserved field of the first congestion notification packet may further carry an identifier of the network node, a queue depth, at a congestion moment, of a queue to which the data flow belongs on the network node, and the like, where the data flow is a flow to which the second data packet belongs.

805. When the agent node receives the first congestion notification packet, the agent node sends the first congestion notification packet to the transmit end.

When receiving the first congestion notification packet, the agent node determines a sending period of the first congestion notification packet based on the queue depth of the queue to which the data flow (that is, the data flow to which the first data packet belongs) belongs on the network node, where the data flow is a flow to which the second data packet belongs, and further sends the received first congestion notification packet to the transmit end based on the determined sending period. Network congestion may occur on at least one network node, and when receiving the second data packet, each network node on which network congestion occurs returns one first congestion notification packet to the agent node. Therefore, the agent node selects a deepest queue depth based on at least one first congestion notification packet, and determines the sending period of the first congestion packet based on the deepest queue depth. The sending period that is of the first congestion notification packet and that is determined by the agent node is inversely proportional to the selected queue depth. If the selected queue depth is greater than a preset length, it indicates that network congestion is relatively serious, and it may be determined that the sending period of the first congestion notification packet is a first period; or if the queue depth is less than a preset length, it indicates that network congestion is relatively light, and it may be determined that the sending period of the first congestion notification packet is a second period. The preset length may be determined based on an empirical value, and the first period is less than the second period.

806. When the transmit end receives the first congestion notification packet, the transmit end decreases a sending rate of a data flow to which the first data packet belongs.

Actually, both a quantity of first congestion notification packets and the sending period of the first congestion notification packet can reflect the current network status. Therefore, when receiving at least one first congestion notification packet, the transmit end may determine, based on a quantity of received first congestion notification packets and the sending period of the first congestion notification packet by using a congestion control algorithm, the sending rate of the data flow to which the first data packet belongs, and further send a subsequent packet of the data flow based on the determined sending rate, to alleviate network congestion.

According to the method provided in this embodiment of this disclosure, when receiving the first data packet, the agent node adds the source queue pair number to the first data packet to obtain the second data packet, sends the second data packet to the network node, and sends the second data packet to the receive end by using the network node. In a process of forwarding the second data packet, if the network node detects network congestion, the network node generates the first congestion notification packet based on the second data packet, and sends the first congestion notification packet to the agent node. The agent node sends the first congestion notification packet to the transmit end, so that the transmit end decreases the sending rate of the data flow to which the first data packet belongs. In this disclosure, when detecting that network congestion occurs, the network node immediately sends the first congestion notification packet to the transmit end, so that the transmit end can decrease, in time, the sending rate of the data flow to which the first data packet belongs, thereby avoiding losing a subsequent packet of the data flow.

Figure 9:
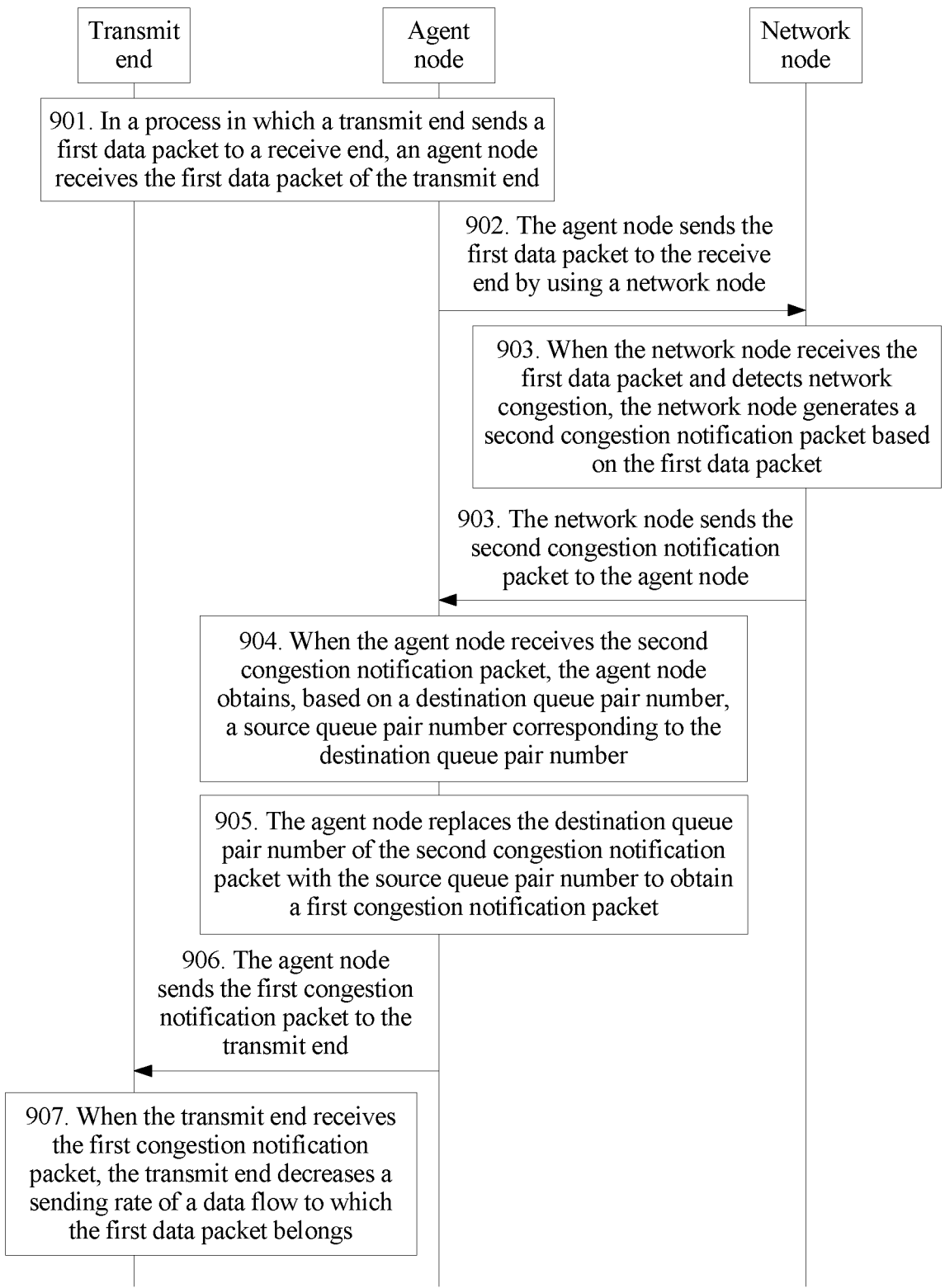
FIG. 9 is a flowchart of a network congestion notification method according to an embodiment of this disclosure.

An embodiment of this disclosure provides a congestion notification method. Referring to FIG. 9, a method procedure provided in this embodiment of this disclosure includes the following steps.

901. In a process in which a transmit end sends a first data packet to a receive end, an agent node receives the first data packet of the transmit end.

Specific implementation of this step is the same as step 801. For details, refer to step 801. Details are not described herein again.

902. The agent node sends the first data packet to the receive end by using a network node.

When receiving the first data packet, the agent node sends the first data packet to the receive end through forwarding of the network node.

903. When the network node receives the first data packet and detects network congestion, the network node generates a second congestion notification packet based on the first data packet, and sends the second congestion notification packet to the agent node.

When the first data packet is transmitted to a network node in a network, the network node detects network congestion. The network node generates the second congestion notification packet based on the first data packet, and a value of an ECN bit of the second congestion notification packet is a value corresponding to a congestion state. The network node further sends the second congestion notification packet to the agent node. The agent node sends the second congestion notification packet to the transmit end, to notify the transmit end of a current network status, so that the transmit end decreases a sending rate of a data flow to which the first data packet belongs. In addition, to ensure normal transmission of a data packet, the network node further continues to send the first data packet to the receive end.

The network node may generate the first congestion notification packet based on the first data packet by performing the following steps.

Step 1: The network node parses the first data packet to obtain a source media access control MAC address of the first data packet, a destination MAC address of the first data packet, a source Internet Protocol IP address of the first data packet, a destination IP address of the first data packet, and a destination queue pair number of the first data packet.

The first data packet carries the source MAC address of the first data packet, the destination MAC address of the first data packet, the source IP address of the first data packet, and the destination IP address of the first data packet. Therefore, the network node may parse the first data packet to obtain the source MAC address of the first data packet, the destination MAC address of the first data packet, the source IP address of the first data packet, and the destination IP address of the first data packet.

Step 2: The network node obtains the second congestion notification packet by using the source MAC address of the first data packet as a destination MAC address of the second congestion notification packet, using the destination MAC address of the first data packet as a source MAC address of the second congestion notification packet, using the source IP address of the first data packet as a destination IP address of the second congestion notification packet, using the destination IP address of the first data packet as a source IP address of the second congestion notification packet, and using the destination queue pair number of the first data packet as a destination queue pair number of the second congestion notification packet.

Based on an RDMA packet format, the network node may obtain the second congestion notification packet by using the source MAC address of the first data packet as the destination MAC address of the second congestion notification packet, using the destination MAC address of the first data packet as the source MAC address of the second congestion notification packet, using the source IP address of the first data packet as the destination IP address of the second congestion notification packet, using the destination IP address of the first data packet as the source IP address of the second congestion notification packet, and using the destination queue pair number of the first data packet as the destination queue pair number of the second congestion notification packet. A reserved field of the second congestion notification packet may further carry an identifier of the network node, a queue depth, at a congestion moment, of a queue to which the data flow belongs on the network node, and the like, where the data flow is a flow to which the first data packet belongs.

904. When the agent node receives the second congestion notification packet, the agent node obtains, based on a destination queue pair number, a source queue pair number corresponding to the destination queue pair number.

When receiving the second congestion notification packet, the agent node searches, based on the destination queue pair number, a pre-established queue pair tracking table for the source queue pair number corresponding to the destination queue pair number. Each entry of the queue pair tracking table stores a correspondence between a destination queue pair number and a source queue pair number.

An establishing process of the queue pair tracking table is the same as an establishing process of the queue pair tracking table in step 802. For details, refer to the establishing process of the queue pair tracking table in step 802. Details are not described herein again.

905. The agent node replaces the destination queue pair number of the second congestion notification packet with the source queue pair number to obtain a first congestion notification packet.

When obtaining the source queue pair number of the first data packet, the agent node may directly replace the destination queue pair number of the second congestion notification packet with the source queue pair number to obtain the first congestion notification packet.

906. The agent node sends the first congestion notification packet to the transmit end.

Specific implementation of this step is the same as step 805. For details, refer to step 805. Details are not described herein again.

907. When the transmit end receives the first congestion notification packet, the transmit end decreases a sending rate of a data flow to which the first data packet belongs.

Specific implementation of this step is the same as step 806. For details, refer to step 806. Details are not described herein again.

According to the method provided in this embodiment of this disclosure, when receiving the first data packet of the agent node and detecting network congestion, the network node sends the generated second congestion notification packet to the agent node. The agent node generates, based on the second congestion notification packet, the first congestion notification packet that carries the source queue pair number of the first data packet, and sends the first congestion notification packet to the transmit end, so that the transmit end decreases the sending rate of the data flow to which the first data packet belongs. In this disclosure, when detecting that network congestion occurs, the network node immediately sends the first congestion notification packet to the transmit end, so that the transmit end can decrease, in time, the sending rate of the data flow to which the first data packet belongs, thereby avoiding losing a subsequent packet of the data flow.

Figure 10:
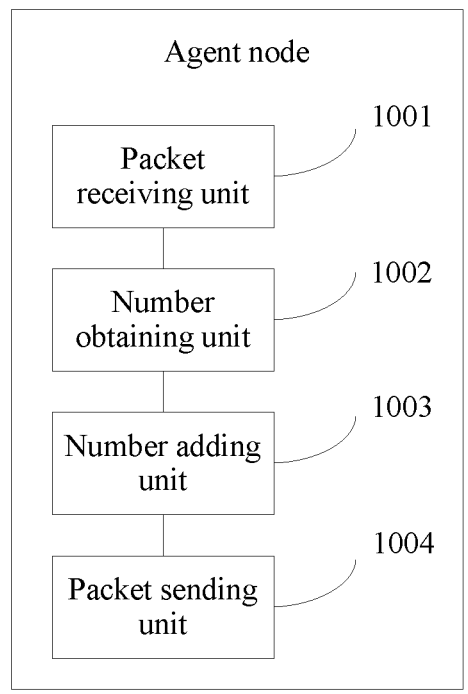
FIG. 10 is schematic structural diagram of an agent node for network congestion notification according to an embodiment of this disclosure.

An embodiment of this disclosure provides an agent node for network congestion notification. Referring to FIG. 10, the agent node includes: a packet receiving unit 1001, configured to receive a first data packet of a transmit end, where the first data packet carries a destination queue pair number; a number obtaining unit 1002, configured to obtain a source queue pair number of the first data packet based on the destination queue pair number; a number adding unit 1003, configured to: add the source queue pair number to the first data packet to obtain a second data packet, and send the second data packet to a receive end by using a network node, where the packet receiving unit 1001 is further configured to receive a first congestion notification packet, where the first congestion notification packet is generated by the network node when the network node receives the second data packet and detects network congestion, and a destination queue pair number of the first congestion notification packet is the source queue pair number; and a packet sending unit 1004, configured to send the first congestion notification packet to the transmit end, where the first congestion notification packet is used to instruct the transmit end to decrease, when the destination queue pair number of the first congestion notification packet is the same as a queue pair number of the transmit end, a sending rate of a data flow to which the first data packet belongs.

In another embodiment of this disclosure, the number obtaining unit 1002 is further configured to search, based on the destination queue pair number, a pre-established queue pair tracking table for the source queue pair number corresponding to the destination queue pair number, where each entry of the queue pair tracking table stores a correspondence between a destination queue pair number and a source queue pair number.

In another embodiment of this disclosure, the number obtaining unit 1002 is further configured to: track a connection request packet and a connection response packet that are respectively sent by the transmit end and the receive end in a connection establishment process; extract a destination queue pair number from a BTH of the connection request packet; extract a destination queue pair number from a BTH of the connection response packet; and use the destination queue pair number extracted from the connection request packet as a destination queue pair number, use the destination queue pair number extracted from the connection response packet as a source queue pair number, and record a correspondence between the source queue pair number and the destination queue pair number to obtain the queue pair tracking table.

In another embodiment of this disclosure, the number adding unit 1003 is further configured to: divide the source queue pair number into a first part and a second part; and add the first part to a checksum field in a UDP header of the first data packet, and add the second part to a reserved field in a BTH of the first data packet, to obtain the second data packet.

In another embodiment of this disclosure, the first congestion notification packet includes a queue depth, at a congestion moment, of a queue to which the data flow belongs on the network node.

The packet sending unit 1004 is further configured to: determine a sending period of the first congestion notification packet based on the queue depth, and send the first congestion notification packet to the transmit end based on the sending period.

Figure 11:
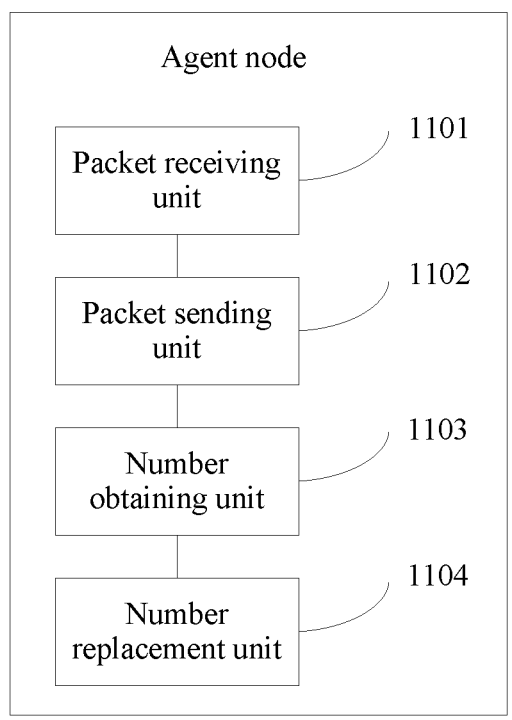
FIG. 11 is schematic structural diagram of an agent node for network congestion notification according to an embodiment of this disclosure.

An embodiment of this disclosure provides an agent node for network congestion notification. Referring to FIG. 11, the agent node includes: a packet receiving unit 1101, configured to receive a first data packet of a transmit end, where the first data packet carries a destination queue pair number; a packet sending unit 1102, configured to send the first data packet to a receive end by using a network node, where the packet receiving unit 1101 is further configured to receive a second congestion notification packet carrying the destination queue pair number, where the second congestion notification packet is generated by the network node when the network node receives the first data packet and detects network congestion; a number obtaining unit 1103, configured to obtain, based on the destination queue pair number, a source queue pair number corresponding to the destination queue pair number; and a number replacement unit 1104, configured to replace the destination queue pair number of the second congestion notification packet with the source queue pair number to obtain a first congestion notification packet, where the packet sending unit 1102 is further configured to send the first congestion notification packet to the transmit end, where the first congestion notification packet is used to instruct the transmit end to decrease, when a destination queue pair number of the first congestion notification packet is the same as a queue pair number of the transmit end, a sending rate of a data flow to which the first data packet belongs.

In another embodiment of this disclosure, the number obtaining unit 1103 is configured to search, based on the destination queue pair number, a pre-established queue pair tracking table for the source queue pair number corresponding to the destination queue pair number, where each entry of the queue pair tracking table stores a correspondence between a destination queue pair number and a source queue pair number.

In another embodiment of this disclosure, the number obtaining unit 1103 is further configured to: track a connection request packet and a connection response packet that are respectively sent by the transmit end and the receive end in a connection establishment process; extract a destination queue pair number from a base transport header BTH of the connection request packet; extract a destination queue pair number from a BTH of the connection response packet; and use the destination queue pair number extracted from the connection request packet as a destination queue pair number, use the destination queue pair number extracted from the connection response packet as a source queue pair number, and record a correspondence between the source queue pair number and the destination queue pair number to obtain the queue pair tracking table.

In another embodiment of this disclosure, the first congestion notification packet includes a queue depth, at a congestion moment, of a queue to which the data flow belongs on the network node.

The packet sending unit 1102 is further configured to: determine a sending period of the first congestion notification packet based on the queue depth, and send the first congestion notification packet to the transmit end based on the sending period.

Figure 12:
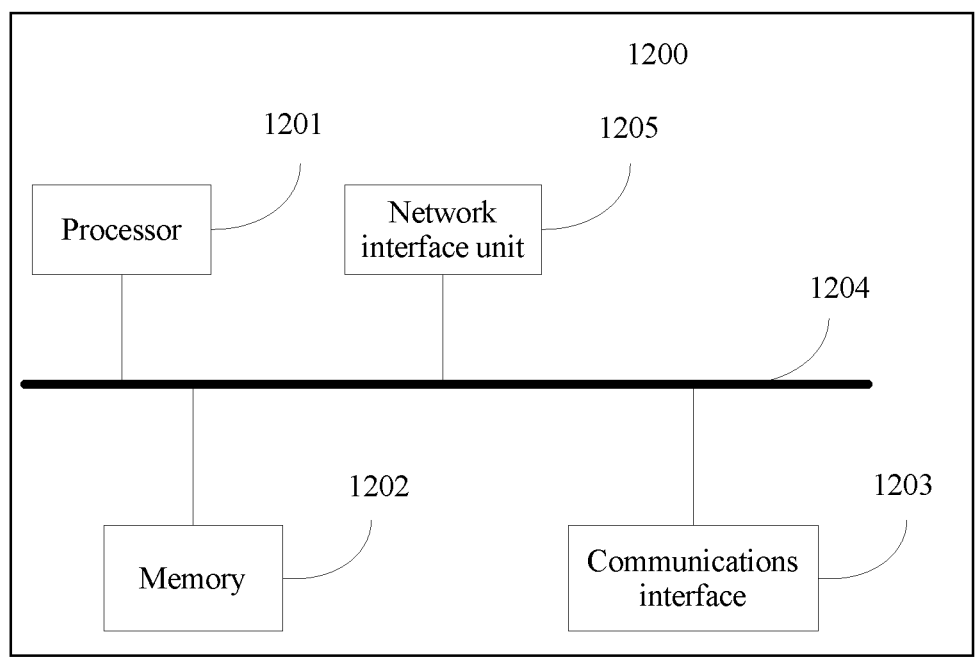
FIG. 12 is a schematic structural diagram of a computer device according to an embodiment of this disclosure.

FIG. 12 shows a computer device 1200 used in an embodiment of this disclosure. The computer device 1200 includes a processor 1201, a memory 1202, a communications interface 1203, and a bus 1204. The processor 1201, the memory 1202, and the communications interface 1203 are connected to each other by using the bus 1204. The computer device 1200 may be an agent node. When the computer device is the agent node, the computer device 1200 is configured to perform the network congestion notification method performed by the agent node in FIG. 8. The memory 1202 is configured to store a computer instruction.

The processor 1201 invokes, by using the bus 1204, the computer instruction stored in the memory 1202, to perform the following operations: receiving a first data packet of a transmit end through the communications interface 1203, where the first data packet carries a destination queue pair number; obtaining a source queue pair number of the first data packet based on the destination queue pair number; adding the source queue pair number to the first data packet to obtain a second data packet, and sending the second data packet to a receive end by using a network node; and receiving a first congestion notification packet through the communications interface 1203, and sending the first congestion notification packet to the transmit end, where the first congestion notification packet is generated by the network node when the network node receives the second data packet and detects network congestion, a destination queue pair number of the first congestion notification packet is the source queue pair number, the first congestion notification packet is used to instruct the transmit end to decrease, when the destination queue pair number of the first congestion notification packet is the same as a queue pair number of the transmit end, a sending rate of a data flow to which the first data packet belongs.

In another embodiment of this disclosure, the processor 1201 invokes, by using the bus 1204, the computer instruction stored in the memory 1202, to perform the following operation: searching, based on the destination queue pair number, a pre-established queue pair tracking table for the source queue pair number corresponding to the destination queue pair number, where each entry of the queue pair tracking table stores a correspondence between a destination queue pair number and a source queue pair number.

In another embodiment of this disclosure, the processor 1201 invokes, by using the bus 1204, the computer instruction stored in the memory 1202, to perform the following operations: tracking a connection request packet and a connection response packet that are respectively sent by the transmit end and the receive end in a connection establishment process; extracting a destination queue pair number from a base transport header BTH of the connection request packet, and extracting a destination queue pair number from a BTH of the connection response packet; and using the destination queue pair number extracted from the connection request packet as a destination queue pair number, using the destination queue pair number extracted from the connection response packet as a source queue pair number, and establishing a correspondence between the extracted source queue pair number and the extracted destination queue pair number to obtain the queue pair tracking table.

In another embodiment of this disclosure, the processor 1201 invokes, by using the bus 1204, the computer instruction stored in the memory 1202, to perform the following operations: dividing the source queue pair number into a first part and a second part; and adding the first part to a checksum field in a UDP header of the first data packet, and adding the second part to a reserved field in a BTH of the first data packet, to obtain the second data packet.

In another embodiment of this disclosure, the first congestion notification packet includes a queue depth, at a congestion moment, of a queue to which the data flow belongs on the network node. The processor 1201 invokes, by using the bus 1204, the computer instruction stored in the memory 1202, to perform the following operations: determining a sending period of the first congestion notification packet based on the queue depth; and sending the first congestion notification packet to the transmit end based on the sending period.

The memory 1202 includes a computer storage medium. The computer storage medium includes volatile, nonvolatile, movable, and unmovable media that are configured to store information such as a computer readable instruction, a data structure, a program module, or other data and that is implemented in any method or technology. The computer storage medium includes a RAM, a ROM, an EPROM, an EEPROM, a flash memory or another solid-state storage technology, a CD-ROM, a DVD or another optical storage, a cassette, a magnetic tape, a magnetic disk storage or another magnetic storage device. Certainly, a person skilled in the art may know that the computer storage medium is not limited to the foregoing several types.

According to the embodiments of this disclosure, the computer device 1200 may be further connected to a remote computer in a network through a network such as the Internet for running. To be specific, the computer device 1200 may be connected to the network by using a network interface unit 1205 connected to the bus 1204, may be connected to a network of another type or a remote computer system (not shown) by using a network interface unit 1205.

It should be noted that when the computer device 1200 is the agent node, the computer device 1200 not only can perform the network congestion notification method performed by the agent node in FIG. 8, but also can perform the network congestion notification method performed by the agent node in FIG. 9. Details are not described again in this embodiment of this disclosure.

An embodiment of this disclosure provides a storage medium. The storage medium stores at least one instruction, and the at least one instruction is loaded and executed by a processor to implement the network congestion notification method shown in FIG. 8 or FIG. 9.

It should be noted that when the network congestion notification system provided in the foregoing embodiment notifies network congestion, division of the foregoing functional modules is merely used as an example for description. In actual application, the foregoing functions may be allocated to different functional modules for implementation according to a requirement. In other words, an inner structure of the device is divided into different functional modules to implement all or some of the foregoing functions described above. In addition, the network congestion notification system provided in the foregoing embodiment and the embodiment of the network congestion notification method belong to a same conception. For a specific implementation process thereof, refer to the method embodiment. Details are not described herein again.

A person of ordinary skill in the art may understand that all or some of the steps of the embodiments may be implemented by hardware or a program instructing related hardware. The program may be stored in a computer-readable storage medium. The storage medium may include a read-only memory, a magnetic disk, or an optical disc.

The foregoing descriptions are merely alternative embodiments of this disclosure, but are not intended to limit this disclosure. Any modification, equivalent replacement, or improvement made without departing from the principle of this disclosure shall fall within the protection scope of this disclosure.

What is claimed is:

1. A method, comprising:
receiving, by a network node, a remote direct memory access (RDMA) packet, wherein the RDMA packet comprises a first destination queue pair number corresponding to a receive end, and wherein the network node is between a transmit end of the RDMA packet and the receive end of the RDMA packet;
generating, by the network node, a congestion notification packet when detecting network congestion, wherein the congestion notification packet comprises a second destination queue pair number, wherein the second destination queue pair number is of a queue pair of the transmit end of the RDMA packet, and wherein the congestion notification packet is configured to instruct the transmit end to decrease a sending rate of a data flow to which the RDMA packet belongs;
sending, by the network node, the congestion notification packet to the transmit end;
receiving, by the network node, a connection establishment packet in a connection establishment process between the transmit end and the receive end, wherein the connection establishment packet comprises a first base transport header (BTH), wherein the first BTH comprises a third destination queue pair number, and wherein the second destination queue pair number is the same as the third destination queue pair number;
receiving, by an agent node, a first data packet of the transmit end, wherein the first data packet carries the first destination queue pair number;
obtaining, by the agent node, a source queue pair number of the first data packet based on the first destination queue pair number;
dividing, by the agent node, the source queue pair number into a first part and a second part; and
generating, by the agent node, the RDMA packet by adding the first part to a first field of the first data packet and adding the second part to a second field of the first data packet.

2. The method of claim 1, wherein the RDMA packet further comprises a first explicit congestion notification (ECN) bit, wherein a value of the first ECN bit indicates that the transmit end has ECN capability, wherein the congestion notification packet further comprises a second ECN bit, and wherein a value of the second ECN bit indicates a congestion state.

3. The method of claim 2, wherein the congestion notification packet further comprises a queue depth, at a congestion moment, of a queue to which the data flow of the RDMA packet belongs on the network node, and wherein the method further comprises:
selecting a sending period of the congestion notification packet based on the queue depth; and
sending the congestion notification packet to the transmit end based on the sending period.

4. The method of claim 1, wherein the congestion notification packet further comprises a queue depth, at a congestion moment, of a queue to which the data flow of the RDMA packet belongs on the network node, and wherein the method further comprises:
selecting a sending period of the congestion notification packet based on the queue depth; and
sending the congestion notification packet to the transmit end based on the sending period.

5. The method of claim 1, wherein the method further comprises obtaining, by the network node, the second destination queue pair number according to the first destination queue pair number.

6. The method of claim 1, wherein the first field comprises a User Datagram Protocol (UDP) header of the first data packet, and wherein the second field comprises a reserved field in a second BTH of the first data packet.

7. The method of claim 6, wherein the agent node comprises the network node.

8. The method of claim 6, further comprising sending, by the agent node, the RDMA packet to the network node.

9. A method, comprising:
generating, by a transmit end, a remote direct memory access (RDMA) packet, wherein the RDMA packet comprises a first destination queue pair number corresponding to a receive end;
sending, by the transmit end, the RDMA packet to the receive end using a network node;
receiving, by the transmit end, a congestion notification packet, wherein the congestion notification packet is based on network congestion, wherein the congestion notification packet comprises a second destination queue pair number, wherein the second destination queue pair number is of a queue pair of the transmit end of the RDMA packet, and wherein the congestion notification packet is configured to instruct the transmit end to decrease a sending rate of a data flow to which the RDMA packet belongs;
decreasing, by the transmit end, the sending rate of the data flow to which the RDMA packet belongs according to the congestion notification packet; and
sending or receiving, by the transmit end, a connection establishment packet in a connection establishment process between the transmit end and the receive end, wherein the connection establishment packet comprises a first base transport header (BTH), wherein the first BTH comprises a third destination queue pair number, and wherein the second destination queue pair number is the same as the third destination queue pair number,
wherein the transmit end comprises an agent node,
wherein generating, by the transmit end, the RDMA packet comprises:
generating, by the transmit end, a first data packet, wherein the first data packet carries the first destination queue pair number;
obtaining, by the agent node, a source queue pair number based on the first destination queue pair number; and
adding, by the agent node, the source queue pair number to the first data packet to obtain the RDMA packet, and
wherein adding the source queue pair number to the first data packet to obtain a second data packet comprises:
dividing the source queue pair number into a first part and a second part;
adding the first part to a checksum field in a User Datagram Protocol (UDP) header of the first data packet; and adding the second part to a reserved field in a second BTH of the first data packet to obtain the RDMA packet.

10. The method of claim 9, wherein the RDMA packet further comprises a first explicit congestion notification (ECN) bit, wherein a value of the first ECN bit indicates that the transmit end has ECN capability, wherein the congestion notification packet further comprises a second ECN bit, and wherein a value of the second ECN bit indicates a congestion state.

11. The method of claim 9, wherein the second destination queue pair number is obtained according to the first destination queue pair number.

12. A system, comprising:
a transmit end configured to:
generate a remote direct memory access (RDMA) packet, wherein the RDMA packet comprises a first destination queue pair number corresponding to a receive end; and
send the RDMA packet to the receive end;
a network node between the transmit end and the receive end and configured to:
receive the RDMA packet;
generate a congestion notification packet when detecting network congestion, wherein the congestion notification packet comprises a second destination queue pair number, wherein the second destination queue pair number is of a queue pair of the transmit end of the RDMA packet, and wherein the congestion notification packet is configured to instruct the transmit end to decrease a sending rate of a data flow to which the RDMA packet belongs;
send the congestion notification packet to the transmit end;
send or receive, a connection establishment packet in a connection establishment process between the transmit end and the receive end, wherein the connection establishment packet comprises a first base transport header (BTH), wherein the first BTH comprises a third destination queue pair number, and wherein the second third destination queue pair number is the same as the third destination queue pair number;
receive the congestion notification packet; and
decrease the sending rate of the data flow to which the RDMA packet belongs according to the congestion notification packet, and
wherein a source queue pair number in the RDMA packet comprises:
a first part in a checksum field in a User Datagram Protocol (UDP) header of the RDMA packet; and
a second part in a reserved field in a second BTH of the RDMA packet.

13. The system of claim 12, wherein the RDMA packet further comprises a first explicit congestion notification (ECN) bit, wherein a value of the first ECN bit indicates that the transmit end has ECN capability, wherein the congestion notification packet further comprises a second ECN bit, and wherein a value of the second ECN bit indicates a congestion state.

14. The system of claim 13, wherein the congestion notification packet further comprises a queue depth at a congestion moment, of a queue to which the data flow of the RDMA packet belongs on the network node, and wherein when sending the congestion notification packet to the transmit end, the network node is configured to:
select a sending period of the congestion notification packet based on the queue depth; and
send the congestion notification packet to the transmit end based on the sending period.

15. The system of claim 12, wherein the congestion notification packet further comprises a queue depth, at a congestion moment, of a queue to which the data flow of the RDMA packet belongs on the network node, and wherein sending the congestion notification packet to the transmit end comprises:
selecting a sending period of the congestion notification packet based on the queue depth; and
sending the congestion notification packet to the transmit end based on the sending period.

16. The system of claim 12, wherein the network node configured to obtain the second destination queue pair number according to the first destination queue pair number.

17. A method, comprising:
generating, by a transmit end, a remote direct memory access (RDMA) packet, wherein the RDMA packet comprises a first destination queue pair number corresponding to a receive end;
sending, by the transmit end, the RDMA packet to the receive end using a network node;
receiving, by the transmit end, a congestion notification packet, wherein the congestion notification packet is based on network congestion, wherein the congestion notification packet comprises a second destination queue pair number, wherein the second destination queue pair number is of a queue pair of the transmit end of the RDMA packet, and wherein the congestion notification packet is configured to instruct the transmit end to decrease a sending rate of a data flow to which the RDMA packet belongs;
decreasing, by the transmit end, the sending rate of the data flow to which the RDMA packet belongs according to the congestion notification packet; and
sending or receiving, by the transmit end, a connection establishment packet in a connection establishment process between the transmit end and the receive end, wherein the connection establishment packet comprises a first base transport header (BTH), wherein the first BTH comprises a third destination queue pair number, and wherein the second destination queue pair number is the same as the third destination queue pair number;
wherein the transmit end comprises an agent node, and wherein generating the RDMA packet comprises:
obtaining, by the agent node, a source queue pair number based on the first destination queue pair number;
dividing, by the agent node, the source queue pair number into a first part and a second part; and
adding, by the agent node, the first part to a checksum filed in a User Datagram Protocol field and adding the second part to a second BTH to generate the RDMA packet.

* * * * *